United States Patent [19]

Cisko

[11] Patent Number: 4,669,606
[45] Date of Patent: Jun. 2, 1987

[54] HYDRAULIC-POWERED APPARATUS WITH MOTION AMPLIFICATION MEANS FOR MOVING CONVEYOR FEEDER MEANS USED IN TRANSPORTING ANODE RODS THROUGH RODDING ROOM MACHINERY

[75] Inventor: Lawrence W. Cisko, Irwin, Pa.

[73] Assignee: Aluminum Company of America, Pittsburgh, Pa.

[21] Appl. No.: 768,433

[22] Filed: Aug. 22, 1985

[51] Int. Cl.$^4$ ............................................. B65G 25/04
[52] U.S. Cl. ........................................ 198/748; 74/110
[58] Field of Search .............. 198/750, 748, 858, 859; 414/17, 18; 901/21; 74/110

[56] References Cited

U.S. PATENT DOCUMENTS 3,949,620  4/1976  Zehnder ............................. 74/110
4,235,421  11/1980  Phillips ......................... 74/110 X
4,308,945  1/1982  Beckmann et al. .................. 198/750

FOREIGN PATENT DOCUMENTS 384758  11/1973  U.S.S.R. ......................... 198/748

Primary Examiner—Joseph E. Valenza
Assistant Examiner—Jonathan D. Holmes
Attorney, Agent, or Firm—Elroy Strickland

[57] ABSTRACT

An apparatus for a moving conveyor feeder comprises an hydraulic actuator to alternatively move a shaft in opposite directions. Motion amplification is operationally coupled to the shaft to amplify the amount of motion thereof, and a conveyor feeder is operationally coupled to the motion amplification; whereby a small amount of linear movement imparted to the shaft by the hydraulic actuator results in a much larger linear movement by the conveyor feeder.

2 Claims, 4 Drawing Figures

HYDRAULIC-POWERED APPARATUS WITH MOTION AMPLIFICATION MEANS FOR MOVING CONVEYOR FEEDER MEANS USED IN TRANSPORTING ANODE RODS THROUGH RODDING ROOM MACHINERY

BACKGROUND OF THE INVENTION

1. Field of the Invention

This invention relates to an improved apparatus for moving a conveyor feeder means used to propel anode rods through rodding room machinery. More particularly, the invention relates to an improved apparatus wherein the short stroke of a fluid-powered piston is amplified by cables and pulleys to move a feeder mechanism.

2. Description of the Prior Art

Spent anodes that are removed from operating electrolytic cells are returned to a carbon plant to be refurbished for reuse in the cells. These spent anodes are attached to the trolleys of a power-and-free conveyor system at the entrance to the rodding room and remain so for the duration of their trip through the room.

Power-and-free conveyor systems incorporate a constantly moving power chain operating above the trolleys. Typically, the power chain has protruding lugs spaced at uniform (and frequent) intervals along its entire length. The trolleys have vertically sliding rods that, when extended, are in the path of the lugs on the power chain. When the power chain lugs contact the extended trolley rods (commonly referred to as "dogs"), the trolleys are moved along the conveyor at the speed of the power chain.

Trolleys are stopped and started frequently during their trip through the rodding room, as it is necessary for the trolleys to remain briefly at each of several work stations. Trolley stops are accomplished by locally increasing the elevation of the power chain so that the lugs disengage the trolley dogs. (There is linkage on each trolley dog that will depress it out of engagement with the power chain if the trolley runs into the rear of a preceding stopped trolley. Consequently, when one trolley is stopped, those following also stop.) Chain-driven trolley motion resumes when the trolley is advanced into a section of conveyor where the power chain has been rerouted down to its original elevation, or when a preceding trolley resumes motion. Thus the "power-and-free" appellation.

Feeders are then necessary to move the trolleys into the various work stations, then back into engagement with the power chain after completion of each operation. The apparatus of the present invention provides the motive force for such feeders.

Conventionally, feed mechanisms for rodding room machinery are mounted on a frame above each machine and are moved by a piston coupled to a long-stroke pneumatic cylinder as depicted diagrammatically in FIG. 1. The piston may be required to move as much as 80 inches or more, thus requiring a large-diameter cylinder, e.g., four inches or more.

A short-stroke, high-powered hydraulic cylinder instead of the long-stroke pneumatic cylinder is desirable if means to amplify the motion of the short-stroke cylinder is made available.

SUMMARY OF THE INVENTION

It is, therefore, an object of this invention to provide an improved, hydraulically powered apparatus for moving a conveyor feeder for rodding room machinery.

It is another object of this invention to provide an improved, hydraulically powered apparatus for moving a conveyor feeder for rodding room machinery which includes motion amplification means.

It is yet another object of this invention to provide an improved, hydraulically powered apparatus for moving a conveyor feeder for rodding room machinery which includes a series of pulleys and cables to provide motion amplification means.

It is a further object of this invention to provide an improved, hydraulically powered apparatus for moving a conveyor feeder for rodding room machinery with motion amplification means which permit an object to be alternatively urged in opposite directions.

It is yet a further object of this invention to provide an improved, hydraulically powered apparatus for moving a conveyor feeder for rodding room machinery with motion amplification means which comprise a series of pulleys and cables to permit an object to be urged in a first direction by extension of the hydraulically powered apparatus and urged in an opposite direction by withdrawal of the hydraulically powered apparatus.

These and other objects of the invention will be apparent from the description and accompanying drawings.

In accordance with the invention, an improved apparatus for moving conveyor feeder means for rodding room machinery comprises an hydraulic actuating means to alternatively move shaft means in opposite directions, motion amplification means operationally coupled to the shaft means to amplify the amount of motion of the shaft means, and conveyor feeder means operationally coupled to the motion amplification means; whereby a small amount of linear movement imparted to the shaft means by the hydraulic actuating means will result in a much larger linear movement by the conveyor feeder means.

DESCRIPTION OF THE PREFERRED EMBODIMENTS

Figure 1:
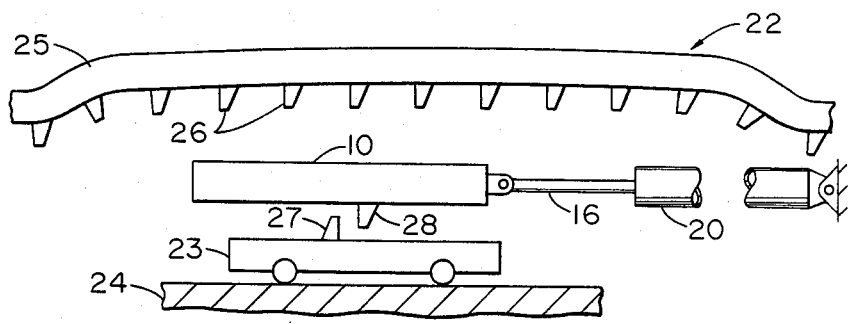
FIG. 1 is a horizontal fragmentary cross-sectional view of a prior art structure.

As shown in FIG. 1, apparatus which typifies the prior art comprises a conveyor feeder means 10 which is coupled through shaft means 16 to a pneumatic cylinder 20. Linear movement of shaft means 16 by actuation of pneumatic cylinder 20 results in the same amount of linear movement by conveyor feed means 10 due to the direct coupling between the two. Thus, large amounts of movement by feeder means 10 must be effected by a corresponding large thrust or withdrawal by the piston (not shown) in pneumatic cylinder 20 coupled to shaft 16.

Conveyor feeder means 10, which itself forms no part of the present invention, is part of a power-and-free conveyor system 22, only diagrammatically depicted in FIG. 1. Such a system, as explained earlier, conventionally includes an overhead trolley 23 which rides on a track 24 located above the rodding room machinery (not shown) and beneath a power chain 25. Power chain 25 is locally elevated, as shown in FIG. 1, at the location of the rodding room, to effect disengagement of lugs 26 of the chain from similar means 27 on the trolleys, and engagement again when each trolley advances to the original lower location of the power chain. Numeral 27 is only a diagrammatic representation of the mechanism that effects movement of the trolley by power chain 25 and feeder 10. Local movement of the trolley is effected by cylinder 20 and feeder 10, feeder 10 having a lug 28 that engages the trolley at 27. Large movement of the trolley along track 24 by such a direct coupled means is awkward due to the required long thrust by shaft 16.

Figure 2:
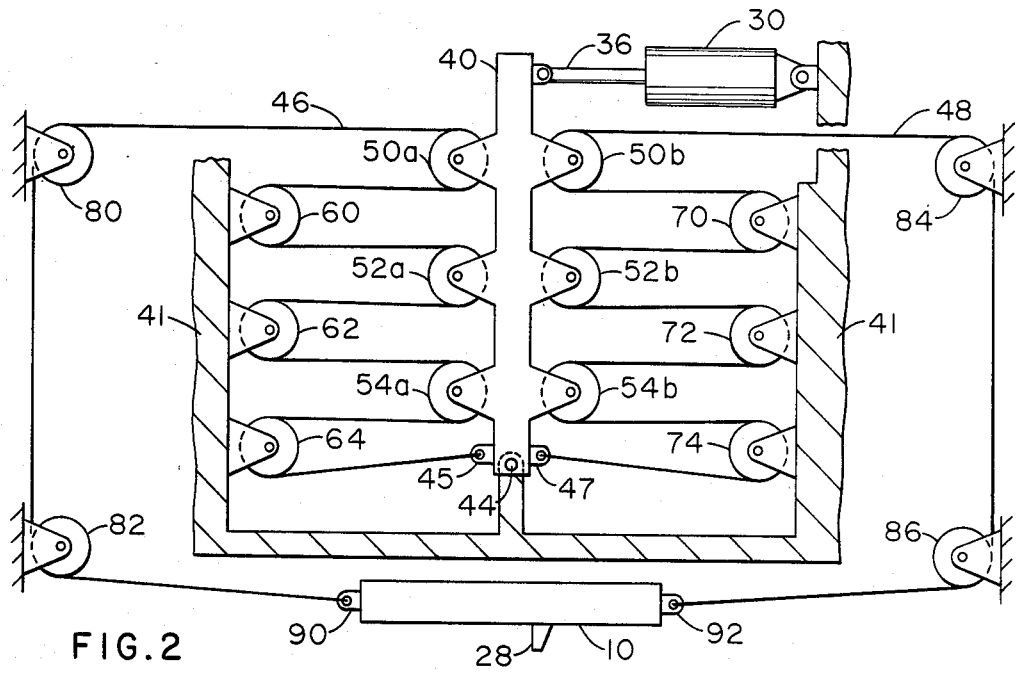
FIG. 2 is a side view of one embodiment of the apparatus of the invention.

Turning now to FIG. 2, the invention is depicted in an easily conceptualized form. In this embodiment, an hydraulic cylinder 30, mounted to a fixed frame 41, is coupled to a short shaft 36 which is connected at its opposite end to a lever arm 40 which is pivotally mounted at 44 to a fixed frame (not shown). Lever 40 has mounted thereto a first set of pulleys or sheaves 50a, 52a, and 54a and a second set of pulleys or sheaves 50b, 52b, and 54b. Also mounted to fixed frame 41 is a first set of pulleys 60, 62, and 64 opposing pulleys 50a-54a and a second set of pulleys 70, 72, and 74 opposing pulleys 50b-54b.

A first cable 46 is mounted at one end 45 to lever 40 adjacent its pivotal mount 44. Cable 46 is threaded through pulleys 54a, 64, 52a, 62, 50a, and 60 which will together provide the motion amplification in a first direction as will be described. Cable 46 is then threaded around pulleys 80 and 82, which serve only as motion redirecting means, to fasten at 90 to one end of conveyor feeder means 10.

A second cable 48 is threaded in similar fashion around pulleys 74, 54b, 72, 52b, 70, and 50b and then around motion redirecting pulleys 84 and 86 to fasten on the opposite end of conveyor feeder means 10 at 92.

When hydraulic cylinder 30 is actuated to thrust shaft 36 out, i.e., to the left in the drawing, lever 40 is pivotally moved by shaft 36 which results in tension in cable 48 translated through movement of pulleys 50b–54b on lever 40. This results in movement of the conveyor feeder means to the right an amount equal to the combined total amount of movement of the seven loops of cable 48 around pulleys 50b-54b and 70-74 to provide the desired motion amplification. At the same time, movement of feeder means to the right provides tension on cable 46 at 90 resulting in the taking up of any slack in the seven loops of cable 46 around pulleys 50a-54a and 60-64. When hydraulic cylinder 30 is again actuated to return shaft 36 to its original position, the process is reversed and the tension in cable 46, caused by the movement of lever 40 and pulleys 50a-54a in the opposite direction, moves feeder means 10 back to the left.

Figure 3:
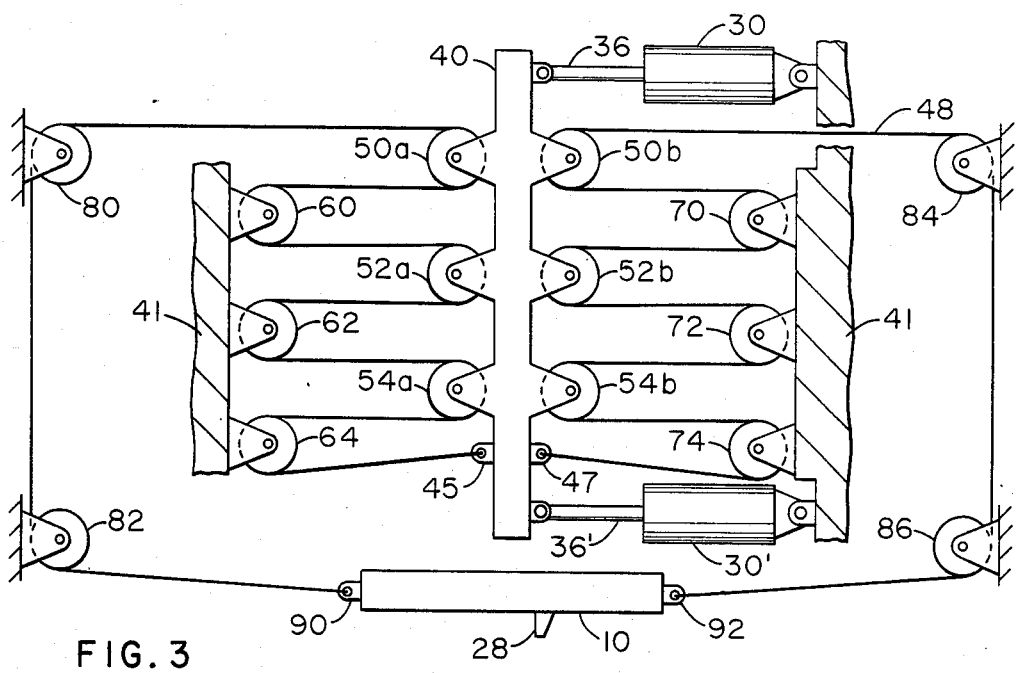
FIG. 3 is a side view of a modification of the embodiment of FIG. 2.

Turning to FIG. 3, a modification of the embodiment of FIG. 2 is illustrated with a second hydraulic cylinder 30' attached to the opposite end of lever 40 through shaft 36'. In this instance, lever 40 is not pivotally attached to a fixed frame. Instead both ends of lever 40 move together when hydraulic cylinders 30 and 30' are simultaneously actuated. This serves to increase the travel of the pulleys on lever 40, particularly the movement of pulleys 54a and 54b since their proximity to pivotal mount 44 in the embodiment of FIG. 2 served to limit the linear movement of these pulleys. Increasing the linear movement of the pulleys increases the movement in the seven loops of the cables around the respective pulleys thus serving to further amplify the amount of linear movement of feeder means 10 with respect to the linear movement of shafts 36 and 36'.

Figure 4:
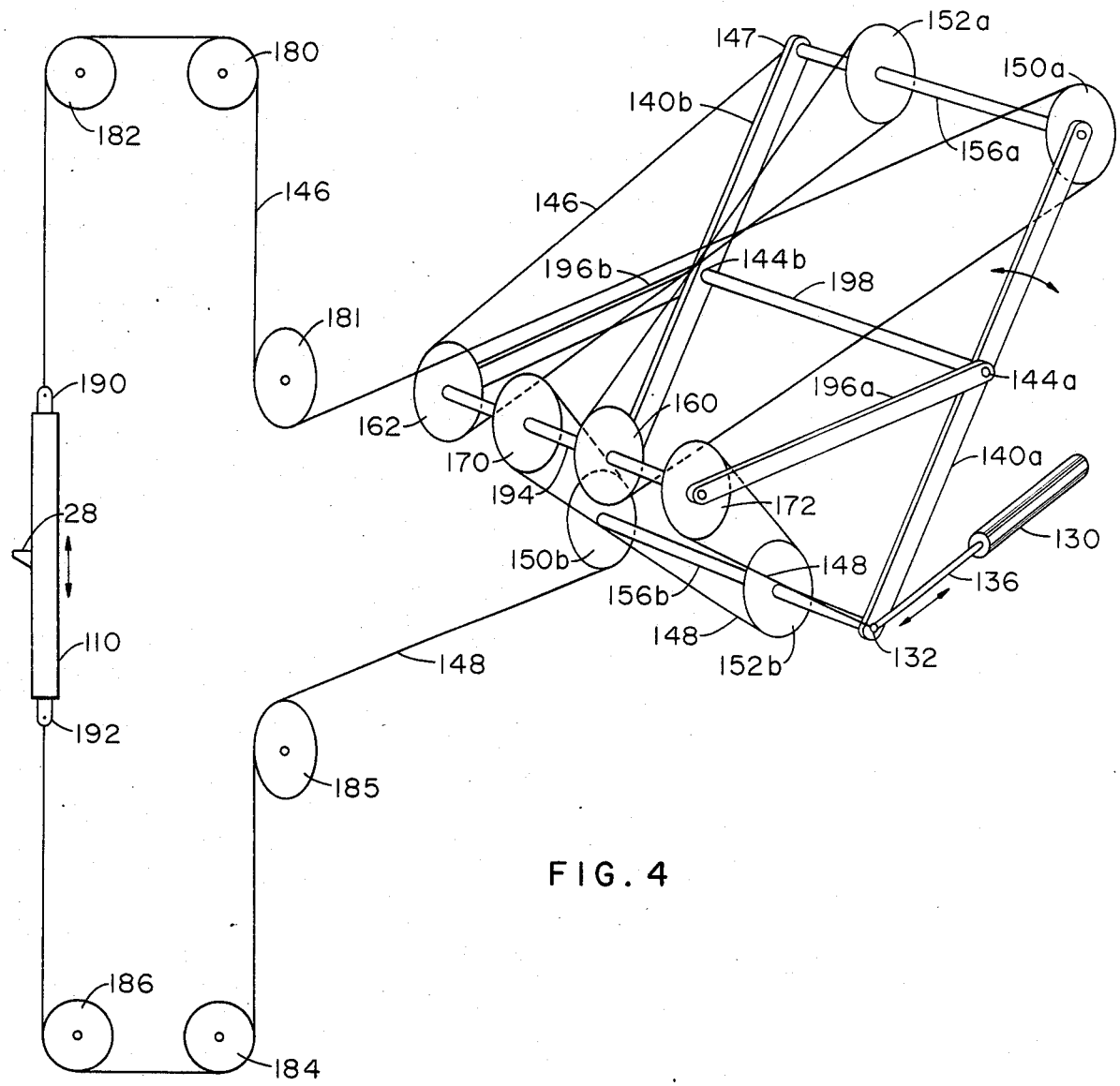
FIG. 4 is a schematic view of another embodiment of the apparatus of the invention.

In FIG. 4 another embodiment is shown wherein a series of pulleys which will provide the desired amount of motion amplification are rotatably mounted on shafts which permit a more compact mounting of the pulleys as well as facilitating the addition of further pulleys to increase the motion amplification if needed.

In this embodiment, a fixed frame comprises a pair of parallel arms 196a and 196b between which extend a first shaft 194 and a second shaft 198. A series of pulleys 160, 162, 170, and 172 are rotatably mounted on shaft 194. A second set of arms 140a and 140b are pivotally mounted at 144a and 144b to the respective ends of shaft 198. On one end of arms 140a and 140b is a shaft 156a which extends between the two arms. A second shaft 156b extends between the respective opposite ends of arms 140a and 140b. In the illustrated embodiment, two pulleys, 150a and 152a, are mounted on shaft 156a while pulleys 150b and 152b are mounted to shaft 156b. Shaft 136 is fastened to one end of arm 140a via attachment means 132 which may comprise a pin to thereby couple hydraulic cylinder 130 to the motion amplification means.

In operation then, actuation of cylinder 130 thrusts out shaft 136 to bring shaft 156b and the pulleys thereon closer to stationary shaft 194. This, in turn, moves pulleys 150a and 152a on shaft 156a further away from stationary shaft 194. Cable 146 is fastened to arm 140b at 147 and is then threaded around pulleys 162, 152a, 160, and 150a and finally around direction-changing pulleys 180-182. Tension on cable 146, caused by movement of shaft 156a away from shaft 194, causes cable 146, which connects to feeder means 110 at 190, to move feeder means 110 upward in the drawing.

It should be noted at this point that feeder means 110 is shown in a vertical position for illustrative purposes only to permit a clearer depiction of the motion amplification portion of the apparatus.

Retraction of cylinder 130 and shaft 136 causes movement of feeder means 110 in an opposite direction. A second cable 148 has one end attached to the end of 110 opposite to that of cable 146. Cable 148 is tensioned due to movement of pulleys 170 and 172, around which cable 148 is threaded, away from pulleys 150b and 152b which also carry cable 148. The other end of 148 is attached to the lower end of frame 144a at location 132.

It will be noted that, in this embodiment, all of the pulleys move laterally at the same rate in contrast to the apparatus of FIG. 2 because of the location of the pivot at a point equidistant from each of the movable pulleys. It will also be readily apparent that the motion amplification can be easily increased in this embodiment as well by simply adding more pulleys respectively to shafts 156a, 156b, and 194.

Thus, the invention provides a novel means for amplifying a short lateral movement of an hydraulic cylinder into a long lateral movement of a feeder means for rodding room machinery whereby the need for a long-thrust pneumatic cylinder device and the attendant problems therewith may be dispensed with.

While the invention has been described in terms of preferred embodiments, the claims appended hereto are intended to encompass all embodiments which fall within the spirit of the invention.

What is claimed is:

1. An apparatus for alternatively moving an object in opposite directions in response to movement of a shaft coupled to an hydraulic power means which comprises:
   (a) a fixed frame having a plurality of pulleys mounted thereon;
   (b) a pair of parallel arms pivotally mounted to said fixed frame adjacent the respective centers of said arms and having:
      (1) a first shaft extending between first ends of said arms; and
      (2) a second shaft extending between the opposite ends of said parallel arms;
   (c) a plurality of pulleys on said first and second shafts;
   (d) a first cable attached at one end to said object to be moved and extending around a pulley on said first shaft, then around a pulley on said fixed frame and then secured to a portion of said apparatus;
   (e) a second cable attached at one end to an opposite end of said object to be moved and extending around a pulley on said second shaft, then around a pulley on said fixed frame, and then secured to a portion of said apparatus; and
   (f) a shaft coupling one end of at least one of said arms to said hydraulic power means; whereby linear movement of said shaft in either direction by said hydraulic power means will result in magnified corresponding linear movement of said object.

2. An apparatus for alternatively moving an object in opposite directions in response to movement of a shaft coupled to a hydraulic power means which comprises:
   (a) a fixed frame having a plurality of pulleys mounted to a first portion thereof and a plurality of pulleys attached to a second portion thereof;
   (b) at least one arm pivotally mounted to said fixed frame and having:
      (1) a first set of pulleys on one side thereof; and
      (2) a second set of pulleys on an opposite side of said pivotally mounted arm;
   (c) a first cable attached at one end to said object to be moved and extending around a plurality of pulleys on said one side of said pivotally mounted arm and around a plurality of pulleys on said first portion of said fixed frame and then secured to a portion of said fixed frame;
   (d) a second cable attached at one end to an opposite end of said object to be moved and extending around a plurality of said second set of pulleys on said pivotally mounted arm and around a plurality of pulleys on said second portion of said fixed frame, and then secured to a portion of said fixed frame; and
   (e) a shaft coupling said pivotally mounted arm to said hydraulic power means;

whereby linear movement of said shaft in either direction by said hydraulic power means will result in magnified corresponding linear movement of said object.

* * * * *